Patented Apr. 28, 1931

1,802,740

UNITED STATES PATENT OFFICE

WILLIAM A. STEINLE, OF FLUSHING, NEW YORK, ASSIGNOR TO THE NAUGATUCK CHEMICAL COMPANY, OF NAUGATUCK, CONNECTICUT, A CORPORATION OF CONNECTICUT

COMPOUNDING AND VULCANIZING RUBBER

No Drawing.     Application filed October 19, 1927.  Serial No. 227,357.

This invention relates to an improved method of incorporating compounding ingredients into rubber. It is more particularly directed to an improved method for incorporating ingredients into rubber by absorption and diffusion thereof into and through the rubber.

It has been proposed to incorporate ingredients into rubber by absorption of the same from the surface of the rubber when applied thereto in the form of a mass of solid material, a solution, or in gaseous form. In some cases these methods have proven unsatisfactory for the reason that certain of these materials are inflammable and when their vapors mix with the surrounding air, form an explosive mixture. Similarly, many of these materials are toxic in nature and for this reason are dangerous to handle. Also those materials which diffuse rapidly into rubber, or their solvents when such are used, tend to soften the surface of the rubber.

It is an object of this invention to incorporate an ingredient or ingredients into rubber by diffusion from a dispersion of the ingredient in a substance which is a non-solvent of both the ingredient and the rubber.

A further object is to provide a method of handling toxic and inflammable materials capable of diffusing into rubber whereby danger to the operator is minimized.

Still another object is to incorporate a liquid or solid into rubber by diffusion without causing softening of the rubber.

Other objects will be apparent from the specification and claims.

In general the invention consists in forming a dispersion in a non-solvent of rubber of an ingredient capable of diffusing into rubber and applying the dispersion to rubber whereby the ingredient is absorbed by the rubber.

In one manner of carrying out the invention in its preferred form a dispersion of carbon disulphide is prepared in any convenient manner. For instance 30 parts by weight of glue are dissolved in 90 parts by weight of water by heating in a steam bath and ½ part of a suitable soap such as sodium or potassium oleate is then stirred into the glue solution by means of a high-speed stirrer. 90 parts by weight of carbon disulphide are then added slowly while mixing with the high-speed stirrer until the emulsion thus formed is stable. Any suitable apparatus for example a colloid mill can be used to effect the dispersion. The glue functions in the foregoing process as a protective agent and the soap serves as a dispersing agent. Other protective and dispersing agents can be used. Water has been stated to be the dispersing medium in the example given and is of advantage to use because of its inertness with respect to rubber and its cheapness. However, other liquids which do not soften or dissolve rubber can be employed among which are alcohol and glycerine.

The dispersion obtained using the particular ingredients in the amounts above set forth is of viscous consistency and will remain stable for prolonged periods of time such as a week or longer. It contains 42.8 grams of carbon disulphide per 100 grams of the dispersion mixture. At ordinary temperatures it will not support combustion and when warmed to 125° F. it burns only slowly. The dispersion is miscible with water in all proportions. Due to its dilute condition the toxic effect of the carbon disulphide on people handling it is greatly reduced.

The carbon disulphide in the condition described is particularly adapted for use for impregnating rubber by diffusion, and the dispersion when used for this purpose can be at its full strength or diluted. The rubber to be treated can be the unshaped stock or the formed article. If the former a preliminary intermixing of rubber and dispersion can also be obtained on the mill. Any suitable method of application to the surface of the rubber can be used. In case of a rubber article it may be preferable to immerse it in the dispersion of carbon disulphide or if the article has an opening or depression in the shape of a receptacle it may be desirable to fill the opening with the dispersion. Because of its scattered condition the carbon disulphide does not diffuse into the rubber rapidly enough to soften the rubber.

As an example of a suitable method for carrying out the diffusion process a stock consisting of 100 parts of rubber, 10 parts of zinc oxide, 2 parts of sulphur, and 2 parts of dibenzyl amine is prepared by mixing in any desired manner, for example by milling. The rubber stock is formed into a sheet approximately one-eighth of an inch thick and is immersed in a dispersion of carbon disulphide in water prepared as above set forth which has been diluted with water to contain 1% by weight of carbon disulphide. The total amount of carbon disulphide contained in the body of the dispersion used is about 5 molecular weights of carbon disulphide for each molecular weight of dibenzyl amine present in the rubber sheet. This is a considerable excess of carbon disulphide over the theoretical amount required, and may be decreased if the time of immersion is increased. A suitable length of time for continuing the immersion for a sheet one-eighth of an inch thick is approximately 16 hours. As the particles of $CS_2$ come into contact with the rubber, diffusion takes place and a complete vulcanizing combination consisting of a metal, sulphur, an amine and carbon disulphide is obtained in the rubber, which combination is capable of vulcanizing the rubber at low temperatures or in a shorter time at elevated temperatures.

The range of time during which the rubber should be exposed to the dispersion may be varied considerably and depends upon the thickness of the stock, the percentage of carbon disulphide in the dispersion, whether or not the liquid is stirred, and other factors. Proper diffusion of the carbon disulphide into the rubber has been obtained at the end of an exposure for four hours when the liquid was gently stirred during that time. Under other conditions as long a time as forty-eight hours may be necessary.

In using the dispersion for the purpose of diffusing carbon disulphide into rubber it is usually convenient, although not necessary, to dilute it with additional amounts of the dispersing medium. Dilution should not be carried out to an extent such that there will be less than approximately .02 grams of carbon disulphide per 100 grams of water. A desirable dispersion to use contains 1% by weight of carbon disulphide. The thickness of the rubber stock for successful treatment by this method ranges from the thickness of paper up to approximately one-half an inch. Stock of greater thickness can be used but a prolonged length of time for diffusion must be allowed.

Since the dispersed carbon disulphide does not diffuse through the water it is usually desirable to stir the dispersion gently in order to insure contact between the various particles of dispersed carbon disulphide and rubber. Gentle stirring also prevents settling of the carbon disulphide. Storage of the dispersion and its use for diffusion purposes is preferably at room temperature.

The rubber stock thus prepared can now be subjected to vulcanization in any suitable manner. Vulcanization will be completed in one hour if heated at 212° F. heat being applied in a mold by steam, air, or water, or by any other method that may be desired. Or if desired the rubber can be vulcanized in less than one hour at temperatures above 212° F. On the other hand the article will vulcanize in two weeks at ordinary temperatures.

As another example in carrying out the invention, a mass of rubber stock of approximately one-quarter of an inch thickness is prepared containing materials intermixed therewith in the following proportions:

100 parts rubber.
100 parts zinc oxide.
60 parts sulphur.
10 parts dibenzyl amine.

Rubber thus prepared can be immersed in an aqueous dispersion of carbon disulphide containing about 5 molecular weights of carbon disulphide for each molecular weight of dibenzyl amine present in the rubber for a period of about 16 hours and diffusion will take place. Vulcanization of the material thus treated can be accomplished in 24 hours at 212° F. and yields a hard rubber.

As a practical application of this process a tank is coated with unvulcanized hard rubber cement, a layer of unvulcanized hard rubber is applied, and subsequently a layer of unvulcanized soft rubber. All three of these layers contain zinc oxide, sulphur and dibenzylamine. After the tank is lined with rubber in this way it is filled with water into which the concentrated aqueous dispersion of carbon disulphide is stirred to form the dilute emulsion of proper carbon disulphide content and concentration. This dilute emulsion is allowed to stand in contact with the rubber for 16 to 48 hours during which time the carbon disulphide is absorbed by the rubber. After emptying out the unused emulsion fresh water is added and heated with steam for twenty-four (24) hours at 212° F. or until the rubber and hard rubber base vulcanize. Steam or hot air can be employed for the vulcanization.

The preferred method of carrying out the invention has been illustrated as applied to the introduction of carbon disulphide into rubber. However, it is contemplated to use this method for introducing any substance into rubber which rubber will absorb when contacted therewith. For example, anticracking agents such as diphenyl sulphoxide can be dissolved in a solvent such as benzol and the solution dispersed in water by a method similar to that used for carbon disulphide. When the dispersion is applied to the surface of a vulcanized rubber composition, the diphenyl sulphoxide will diffuse into the rubber. Vulcanized rubber composition when treated with anti-cracking agents in this manner is made resistant to the action of sun light. Vulcanization retarders such as ethyl oxalate can be incorporated into rubber by dissolving the same in a solvent such as benzol, dispersing the solution in water and diffusing the ethyl oxalate from the dispersion into rubber. Vulcanized rubber when treated in this manner shows an increased resistance to overvulcanization when subjected to conditions which would normally effect overvulcanization of the rubber compound not so treated. Dyes such as lithol toner red can be incorporated into rubber by dissolving the same in a solvent such as benzol, dispersing the solution in water and applying the dispersion to the surface of the rubber. Rubber composition treated in this manner becomes colored by the dye. Anti-oxidants such as acetaldehyde aniline acid condensate, acetaldehyde ortho toluidine, and paranitroso diphenyl amine, can be incorporated into rubber in a similar manner and improve the resistance to oxidation of the rubber composition so treated. For example, the acetaldehyde aniline acid condensate is dissolved in a solvent such as benzol, dispersed in water and applied to the surface of the rubber composition to be treated. Solid materials which have the property of diffusing into rubber in their solid state, can be dispersed as a suspension in water or other dispersion medium and applied to the rubber composition. For example, acetaldehyde aniline acid condensate can be dissolved in a solvent which is miscible with water, for example, alcohol, and the solution thoroughly intermixed with water leaving the acetaldehyde aniline acid condensate in the form of a suspension in water.

Among materials other than those previously described which can be used, are oxy normal butyl thiocarbonic acid disulphide, carbon oxy sulphide, dibenzylamine, zinc dimethyl dithiocarbamate, tetramethylthiuramdisulphide, and zinc butyl xanthogenate. Other solvents than benzol can be used, for example, carbon tetrachloride, solvent naphtha, chloroform, toluol, etc., and the desired results obtained. The methods described can be employed for treating unvulcanized, vulcanizing or vulcanized compositions of rubber, balata or gutta percha with vulcanizing ingredients, age improvers, dyes, vulcanization retarders and compounding ingredients in general which have the property of diffusing into rubber when contacted with the same. Instead of immersing the rubber composition in the aqueous dispersion of the ingredients, the dispersion can be sprayed upon rubber composition or the rubber can be painted therewith. Two or more ingredients can be applied to the rubber composition at the same time and from the same body of dispersion. For example, a dye can be dissolved in carbon disulphide, the solution dispersed in water and applied to a rubber composition containing zinc oxide, sulphur and dibenzylamine, thereby obtaining a dyed vulcanizable rubber composition. Similarly, by dissolving a dye, an anti-oxidant and a vulcanizing ingredient in a common solvent, for example, solvent naphtha, dispersing the solution in water and applying the dispersion to the surface of a rubber composition, all three ingredients can be incorporated into the rubber during one operation. It is obvious that any or all of the ingredients enumerated can be combined into a common dispersion in water or other suitable medium and applied to the rubber composition if desired.

Having thus described my invention what I claim and desire to protect by Letters Patent is:

1. A process of treating rubber of similar material which comprises dispersing a vulcanizing ingredient capable of diffusing into rubber in a liquid non-solvent of rubber, contracting the rubber composition with the dispersion, diffusing the vulcanizing ingredient into the rubber composition, and vulcanizing the rubber.

2. A process of treating rubber or similar material which comprises forming a dispersion in a liquid which is a non-solvent of rubber of a vulcanizing ingredient and a dye capable of diffusing into rubber, diffusing the vulcanizing ingredient and the dye into the rubber composition, and vulcanizing.

3. A process of treating rubber or similar material which comprises dissolving a dye capable of diffusing into rubber in a liquid vulcanizing ingredient having the same property dispersing the solution in a liquid which does not soften rubber, contacting a rubber composition with the dispersion whereby the dye and vulcanizing ingredient are diffused into the rubber composition, and vulcanzing.

4. A process of treating rubber or similar material which comprises forming a dispersion of a vulcanizing ingredient capable of diffusing into rubber in a liquid which does not soften rubber, contacting the surface of a rubber composition with the dispersion, causing circulation of the dispersion past the surface of the composition, and vulcanizing.

5. A process of treating rubber or similar material which comprises preparing a rubber composition containing a vulcanizing ingredient, contacting with the rubber composition a dispersion in a liquid which is a non-solvent of rubber of a complementary vulcanizing ingredient whereby the complementary vulcanizing ingredient is absorbed by the rubber composition, and vulcanizing.

6. A process of treating rubber or similar material which comprises preparing a rubber composition containing an incomplete vulcanizing combination, diffusing into rubber a complementary vulcanizing ingredient from a dispersion of the same in a liquid non-solvent of rubber to complete the vulcanizing combination, and vulcanizing the rubber.

Signed at New York, county and State of New York, this 13th day of October, 1927.

WILLIAM A. STEINLE.